United States Patent
Gattami et al.

(10) Patent No.: US 9,723,643 B2
(45) Date of Patent: Aug. 1, 2017

(54) METHODS AND NODES FOR SUPPORTING D2D COMMUNICATION

(71) Applicant: Telefonaktiebolaget L M Ericsson (publ), Stockholm (SE)

(72) Inventors: Ather Gattami, Stockholm (SE); Gabor Fodor, Hässelby (SE); Göran N. Klang, Enskede (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 404 days.

(21) Appl. No.: 14/372,238

(22) PCT Filed: Apr. 16, 2014

(86) PCT No.: PCT/SE2014/050470
§ 371 (c)(1),
(2) Date: Jul. 15, 2014

(87) PCT Pub. No.: WO2015/160294
PCT Pub. Date: Oct. 22, 2015

(65) Prior Publication Data
US 2016/0345371 A1    Nov. 24, 2016

(51) Int. Cl.
*H04W 76/02* (2009.01)
*H04W 76/04* (2009.01)
(Continued)

(52) U.S. Cl.
CPC ...... *H04W 76/023* (2013.01); *H04B 7/15507* (2013.01); *H04W 24/10* (2013.01); *H04W 76/043* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2007/0115884 A1* | 5/2007 | Shang | H04W 36/30 370/331 |
| 2009/0003216 A1* | 1/2009 | Radunovic | H04L 45/123 370/237 |

(Continued)

OTHER PUBLICATIONS

Abedini. Harnessing Multiple Wireless Interfaces for Guaranteed QoS in Proximate P2P Networks. IEEE. 2012 1st IEEE International Conference on Communications in China (ICCC). 2012.*

(Continued)

*Primary Examiner* — Jeffrey M Rutkowski
*Assistant Examiner* — Andre Tacdiran
(74) *Attorney, Agent, or Firm* — Murphy, Bilak & Homiller, PLLC

(57) ABSTRACT

A Device-to-Device (D2D) communication between a first wireless device served by a first base station and a second wireless device served by a second base station is supported by employing an assisting node that cooperates with the first base station by creating a network code form (f(x1,x2)) of first data (x1) transmitted by the first wireless device and second data (x2) transmitted by the second wireless device. The assisting node transmits the network coded form of the first and second data to the first base station, such that the first base station is able to determine the second data (x2) based on the received first data (x1) and the network coded form (f(x1,x2)), and to transmit the second data to the first wireless device, for combining with data received by the second wireless device in the D2D communication.

15 Claims, 8 Drawing Sheets

(51) Int. Cl.
*H04B 7/155* (2006.01)
*H04W 24/10* (2009.01)
*H04W 88/04* (2009.01)

(56) References Cited

U.S. PATENT DOCUMENTS

| | | | | |
|---|---|---|---|---|
| 2012/0213173 A1* | 8/2012 | Malladi | H04B 7/15521 | 370/329 |
| 2013/0034082 A1* | 2/2013 | Etemad | H04W 36/14 | 370/331 |
| 2013/0051377 A1* | 2/2013 | Seferoglu | H04W 28/0236 | 370/338 |
| 2014/0185587 A1* | 7/2014 | Jang | H04W 36/0005 | 370/331 |
| 2014/0211706 A1* | 7/2014 | Kim | H04W 72/1289 | 370/329 |
| 2014/0213221 A1* | 7/2014 | Chai | H04W 36/30 | 455/411 |
| 2016/0100442 A1* | 4/2016 | Xu | H04W 68/005 | 370/329 |
| 2016/0323892 A1* | 11/2016 | Pradini | H04B 7/15557 | |

OTHER PUBLICATIONS

Chiu. Can Network Coding Help 1n P2P Networks? IEEE. 0-7803-9550-6/06/. 2006.*

Rodziewicz. Network Coding Aided Device-to-Device Communication. European Wireless 2012, Apr. 18-20, 2012, Poznan, Poland. ISBN 978-3-8008-3426-9.*

Doppler, Klaus et al., "Innovative concepts in Peer-to-Peer and Network Coding", Celtic Telecommunication Solutions, Wireless World Initiative New Radio—Winner+, CP5-026, Jan. 16, 2009, pp. 1-25.

Fodor, Gábor et al., "Design Aspects of Network Assisted Device-to-Device Communications", IEEE Communications Magazine, Mar. 2012, pp. 170-177.

* cited by examiner

| Gi (i=1,2) | G12 | G12-Gi | Mode |
|---|---|---|---|
| -- | < Th1 | -- | 1. (Cellular) |
| > Th2 | > Th1 | > Th3 | 2. (D2D, dedicated) |
| < Th2 | > Th1 | > Th3 | 3. (D2D, reused) |
| < Th2 | > Th1 | < Th3 | 4. (D2D + NWC) |

Fig. 11

METHODS AND NODES FOR SUPPORTING D2D COMMUNICATION

TECHNICAL FIELD

The present disclosure relates generally to a first base station of a radio network, an assisting node, a first wireless device and methods therein, for supporting Device-to-Device, D2D, communication between the first wireless device and a second wireless device.

BACKGROUND

When two wireless devices communicate with each other in a radio network in a traditional manner, each wireless device communicates radio signals with a serving base station of the radio network by sending uplink radio signals to the base station as well as receiving downlink radio signals from the base station. This is the traditional way of communication in a radio network also when the two wireless devices are located somewhat close to one another and being served by the same base station. This operation mode is commonly referred to as a cellular mode of communication. Recently, techniques have been developed to enable wireless devices in close proximity of one another to communicate radio signals with each other directly, i.e. direct communication, as controlled by the radio network and using frequency spectrum licensed to the network, such that each wireless device receives and decodes the actual radio signals that are transmitted from the opposite, or "peer", wireless device. Bluetooth is another example of direct communication between wireless devices, although without control or involvement by any network and using unlicensed frequency spectrum.

Communication of radio signals may thus take place directly between the two wireless devices without the radio signals being communicated over the radio network via one or more base stations. In that case, the serving base station allocates radio resources, e.g. defined by time and/or frequency, which the wireless devices are allowed to use in the direct communication. Such direct communication between two wireless devices is commonly referred to as "Device-to-Device, D2D, communication" or terminal-to-terminal communication.

In the field of cellular radio technology, the term "wireless device" is usually used and will be used in this disclosure to represent any wireless communication entity capable of radio communication with a cellular radio network including receiving and sending radio signals. Another common term in this field is "User Equipment, UE" which is often used for various wireless devices such as e.g. mobile telephones, tablets and laptop computers. A wireless device in this context could also be a machine-to-machine type of device operating automatically such as a sensor, counter or measuring entity.

Further, the term "base station", sometimes also referred to as a network node, radio node, e-NodeB, eNB, NB, base transceiver station, access point, etc., is used here to represent any node of a cellular radio network that is arranged to communicate radio signals with wireless devices. The base station described here may, without limitation, be a so-called macro base station or a low power base station such as a micro, pico, femto, Wifi or relay node, to mention some customary examples. Throughout this disclosure, the terms "network node" and "User Equipment, UE" could alternatively be used instead of base station and wireless device, respectively.

D2D communication may thus be employed whenever two wireless devices, also referred to as "peer devices" or just "peers", are close enough to one another to be able to receive and decode direct radio signals from the opposite peer. Thereby, it may be possible to reduce the transmit power consumed and emitted in the area and also to reduce interference, as compared to what is required to enable a serving base station to communicate radio signals with the wireless devices in the traditional manner. Another advantage with D2D communication is that less radio resources are required than the conventional cellular communication. For example, two timeslots are needed for conveying a piece of data from one device to the other device in cellular communication while only one timeslot is needed for conveying the same piece of data in D2D communication. FIG. 1 illustrates various radio links that may be used for conveying data from a first wireless device D1 to a second wireless device D2. 100 denotes a D2D radio link between the devices D1 and D2, while 102a and 102b denote respective cellular radio links between the devices D1, D2 and a serving base station BS.

In a conventional cellular communication between a base station and a wireless device, a radio signal transmitted by the wireless device may be successfully received and decoded by the base station provided that the current radio conditions allow for sufficient quality of the received signals. This means that the received signal should not be too weak and/or interfered too much by other radio transmissions in the neighborhood for satisfactory reception and decoding. For example, the wireless device may be situated close to the cell edge and relatively far from the base station, or in a spot with bad radio coverage, so that the radio signal fades considerably on its way to the base station. Furthermore, the wireless device may in that case need to transmit with increased power in order to provide a sufficiently strong signal at the receiving base station, which may cause harmful interference to other nearby communications. Another possibility is to add redundant bits which can be used to assist the decoding in the base station's receiver although they occupy precious radio resources such that overall data throughput is reduced.

In a similar manner, when a D2D communication is employed between two wireless devices, a radio signal transmitted by one wireless device may be successfully received and decoded by the other wireless device provided that the current radio conditions allow for sufficient quality of the received signals. The requirements for successful reception and decoding are thus similar to the case of cellular mode discussed above. However, the signal quality in such a D2D communication with low power may not be sufficient for successful decoding of communicated data, and it may be required that at least one of the two communicating wireless increases its transmit power for favorable signal reception which in turn increases the power consumption and risk for interference.

It is thus a problem to achieve adequate signal quality and successful decoding of data when using D2D communication between two wireless devices, without causing too much interference and/or reduction of data throughput and/or power consumption, particularly under less than optimal radio conditions.

SUMMARY

It is an object of embodiments described herein to address at least some of the problems and issues outlined above. It is possible to achieve this object and others by using methods and nodes as defined in the attached independent claims.

According to one aspect, a method is performed by a first base station of a radio network, for supporting a D2D communication between a first wireless device and a second wireless device, the first wireless device being served by the first base station and the second wireless device being served by a second base station in the radio network. In this method, the first base station receives first data from the first wireless device, and transmits the first data to an assisting node which may be the second base station or a third wireless device. The first base station further receives from the assisting node a network coded form of the first data and second data, wherein the second data has been transmitted by the second wireless device to the assisting node.

The first base station then determines the second data based on the first data received from the first wireless device and on the network coded form of the first and second data received from the assisting node, and transmits the determined second data to the first wireless device, thus supporting the D2D communication by enabling the first wireless device to determine the second data by combining the second data transmitted by the second wireless device in the D2D communication and the second data transmitted by the first base station.

According to another aspect, a first base station is operable in a radio network and arranged to support a D2D communication between a first wireless device and a second wireless device, the first wireless device being served by the first base station and the second wireless device being served by a second base station in the radio network. The first base station comprises means configured to receive first data from the first wireless device, transmit the first data to an assisting node, and to receive from the assisting node a network coded form of the first data and second data, wherein the second data has been transmitted by the second wireless device to the assisting node.

The first base station also comprises means configured to determine the second data based on the first data received from the first wireless device and on the network coded form of the first and second data received from the assisting node, and to transmit to the first wireless device the determined second data, thus supporting the D2D communication by enabling the first wireless device to determine the second data by combining the second data transmitted by the second wireless device in the D2D communication and the second data transmitted by the first base station.

According to yet another aspect, a method is performed by an assisting node in a radio network, for supporting a Device-to-Device, D2D, communication between a first wireless device and a second wireless device, the first wireless device being served by a first base station in the radio network and the second wireless device being served by a second base station in the radio network. In this method, the assisting node receives first data from the first base station wherein the first data has been transmitted by the first wireless device to the first base station, and receives second data from the second wireless device. The assisting node also creates a network coded form of the first and second data by applying a network coding function on the first data and the second data, and transmits the network coded form of the first and second data to the first base station, thus supporting the D2D communication by enabling the first base station to determine the second data based on the first data and on the network coded form of the first and second data, and to transmit the determined second data to the first wireless device.

According to yet another aspect, an assisting node is operable in a radio network and arranged to support a Device-to-Device, D2D, communication between a first wireless device and a second wireless device, the first wireless device being served by a first base station in the radio network and the second wireless device being served by a second base station in the radio network. The assisting node comprises means configured to receive first data from the first base station wherein the first data has been transmitted by the first wireless device to the first base station, and to receive second data from the second wireless device. The assisting node further comprises means configured to create a network coded form of the first and second data by applying a network coding function on the first data and the second data, and to transmit the network coded form of the first and second data to the first base station, thus supporting the D2D communication by enabling the first base station to determine the second data based on the first data and on the network coded form of the first and second data, and to transmit the determined second data to the first wireless device.

According to yet another aspect, a method is performed by a first wireless device in a radio network for supporting a D2D communication between the first wireless device and a second wireless device, the first wireless device being served by a first base station in the radio network and the second wireless device being served by a second base station in the radio network. In this method, the first wireless device transmits first data to the second wireless device and to the first base station, receives second data from the second wireless device in the D2D communication, and receives the second data also from the first base station in a cellular communication between the first wireless device and the first base station. The first base station has determined the second data based on the first data received from the first wireless device and on a network coded form of the first and second data received from an assisting node. The first wireless device then determines the second data by combining the second data received from the second wireless device and the second data received from the first base station.

According to yet another aspect, a first wireless device is operable in a radio network and arranged to support D2D communication between the first wireless device and a second wireless device, the first wireless device being served by a first base station in the radio network and the second wireless device being served by a second base station in the radio network. The first wireless device comprises means configured to transmit first data to the second wireless device and to the first base station, receive second data from the second wireless device in the D2D communication, and to receive the second data from the first base station in a cellular communication between the first wireless device and the first base station.

The first base station has determined the second data based on the first data received from the first wireless device and on a network coded form of the first and second data received from an assisting node. The first wireless device further comprises means configured to determine the second data by combining the second data received from the second wireless device and the second data received from the first base station.

Advantages that may result from implementing one or more of the embodiments described herein include that the required transmit power can be reduced and still achieving successful reception and decoding. Thereby, benefits such as improved spectral and energy efficiency, efficient resource utilization, reduced interference and lower power consumption, may be achieved in the radio network.

Each of the above methods may be implemented in a computer program comprising instructions which, when executed on at least one processor, cause the at least one processor to carry out the respective method. A respective carrier may contain each computer program, wherein each carrier may be one of an electronic signal, optical signal, radio signal, or computer readable storage medium.

The above methods, first base station, assisting node and first wireless device may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which:

FIG. 4b illustrates an exemplifying timeslot scheme that may be used when implementing the procedure depicted in FIG. 4a.

FIG. 11 is a table for mode selection according to the procedure of FIG. 10.

DETAILED DESCRIPTION

In this solution it has been recognized that a favorable communication between a first wireless device being served by a first base station and a second wireless device being served by a second base station, may be achieved by employing a D2D communication assisted by network coding, NWC, performed either by the two base stations or by a third wireless device and the first base station. This can be used to improve the possibility of receiving and determining data successfully at the first and second wireless devices. Some examples of how this may be carried out will be described below.

Briefly described, an assisting node is employed which cooperates with the first base station by creating a network code form of first data x1 transmitted by the first wireless device and second data x2 transmitted by the second wireless device, the network coded form being denoted f(x1,x2) throughout this description. The assisting node then transmits the network coded form of the first and second data f(x1,x2) to the first base station, such that the first base station is able to determine the second data x2 based on the received first data x1 and network coded form f(x1,x2), and to transmit the second data x2 to the first wireless device. Thereby, the first wireless device is able to determine, e.g. decode, the second data x2 more accurately by combining the second data x2 transmitted by the second wireless device D2 in the D2D communication and the second data x2 transmitted by the first base station. The above procedure will be described in more detail below with reference to FIGS. 4a and 4b.

Figure 1:
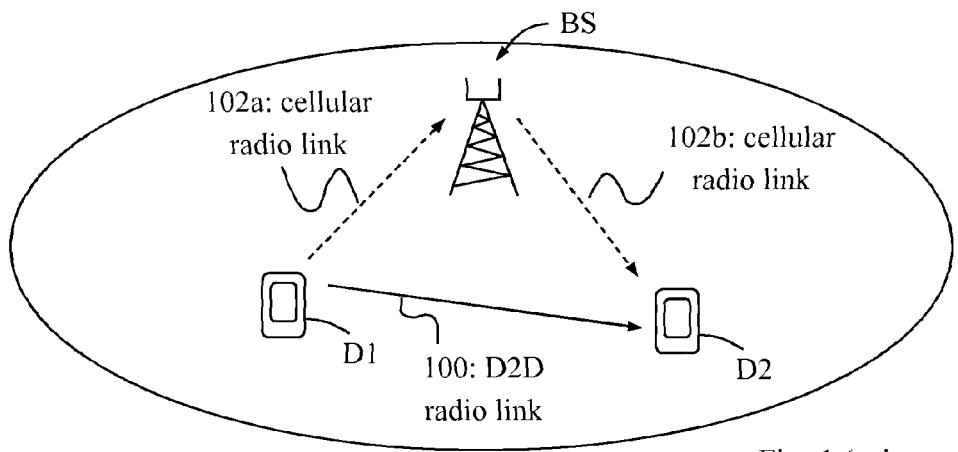
FIG. 1 illustrates a communication scenario with radio links for D2D communication and for cellular communication, according to the prior art.
Figure 2:
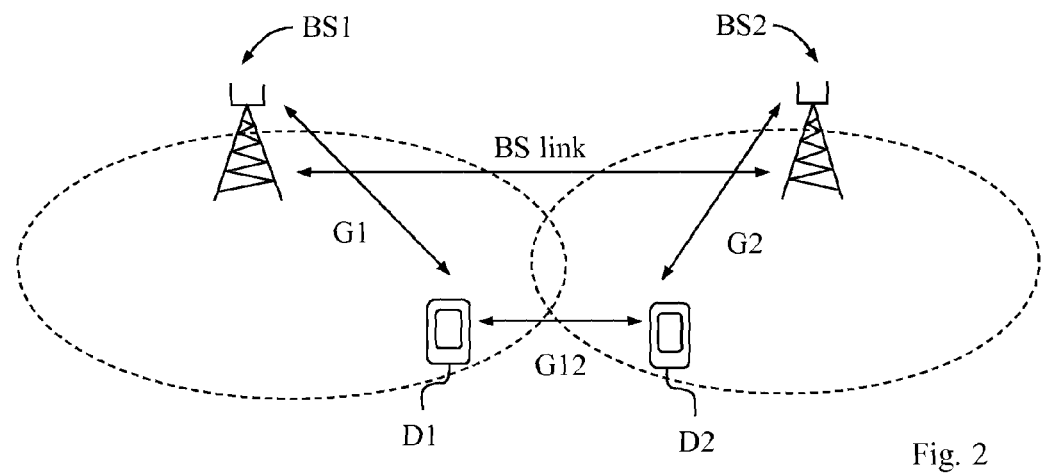
FIG. 2 illustrates a communication scenario where an assisting node is implemented in a base station for assisting a D2D communication, which may be employed in embodiments herein.

First, it will be described how he above assisting node may be implemented in different ways. In a first example, the second base station may be employed to act as the assisting node, as illustrated in FIG. 2 which shows a first wireless device D1 being served by, i.e. being connected to, a first base station BS1, and a second wireless device D2 being served by, i.e. being connected to, a second base station BS2. The radio links in this figure have respective channel gains that indicate a quality of the respective links, including a channel gain G12 of the D2D radio link between the devices D1 and D2, a channel gain G1 of the cellular radio link between the first device D1 and the first base station BS1, and a channel gain G2 of the cellular radio link between the second device D2 and the second base station BS2. These radio links are used in the communication of this example. An algorithm may be employed for deciding whether it is favorable to use this solution instead of using other operation modes, which algorithm is based on these channel gains, which will be described in more detail later below.

The communication in this example further requires another communication link between the first and second base stations BS1, BS2, denoted BS link, in order to convey the network coded form f(x1,x2) from BS2 to BS1. This link may be a radio link or a fixed link depending on how the radio network is configured. In Long Term Evolution, LTE, networks, the communication link between base stations is termed the X2 interface which may be wired or wireless. In this case, it is thus the second base station BS2 that receives the first data x1 from BS1 and the second data x2 from D2, creates the network coded form of the first and second data f(x1,x2), and transmits it to the first base station BS1 over the BS link.

In a second example, another wireless device, termed a third wireless device D3, may be employed to act as the assisting node, as illustrated in FIG. 3 which again shows a first wireless device D1 being served by a first base station BS1 and a second wireless device D2 being served by a second base station BS2. The communication in this example further requires a D2D radio link between the third device D3 and the second device D2 with channel gain G23, over which link the assisting node, i.e. D3, receives the second data x2 from device D2. A cellular radio link with channel gain G3 is also required between the assisting node, i.e. D3, and the first base station BS1, thus D3 should be served by BS1. In this case, it is the third wireless device D3 that creates the network coded form of the first and second data f(x1,x2) and transmits it to the first base station BS1 over the cellular link with channel gain G3.

Figure 3:
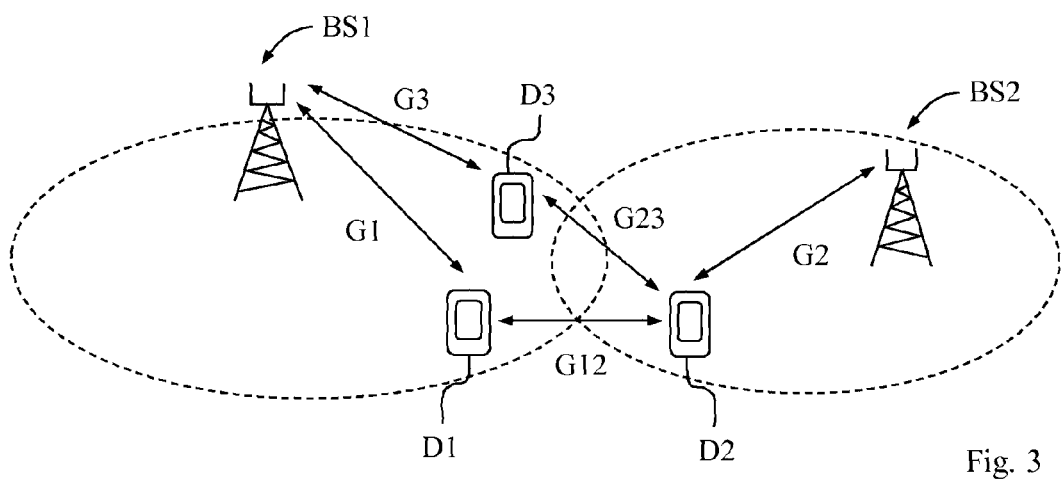
FIG. 3 illustrates another communication scenario where an assisting node is implemented in a wireless device for assisting a D2D communication, which may be employed in embodiments herein.
Figure 4A:
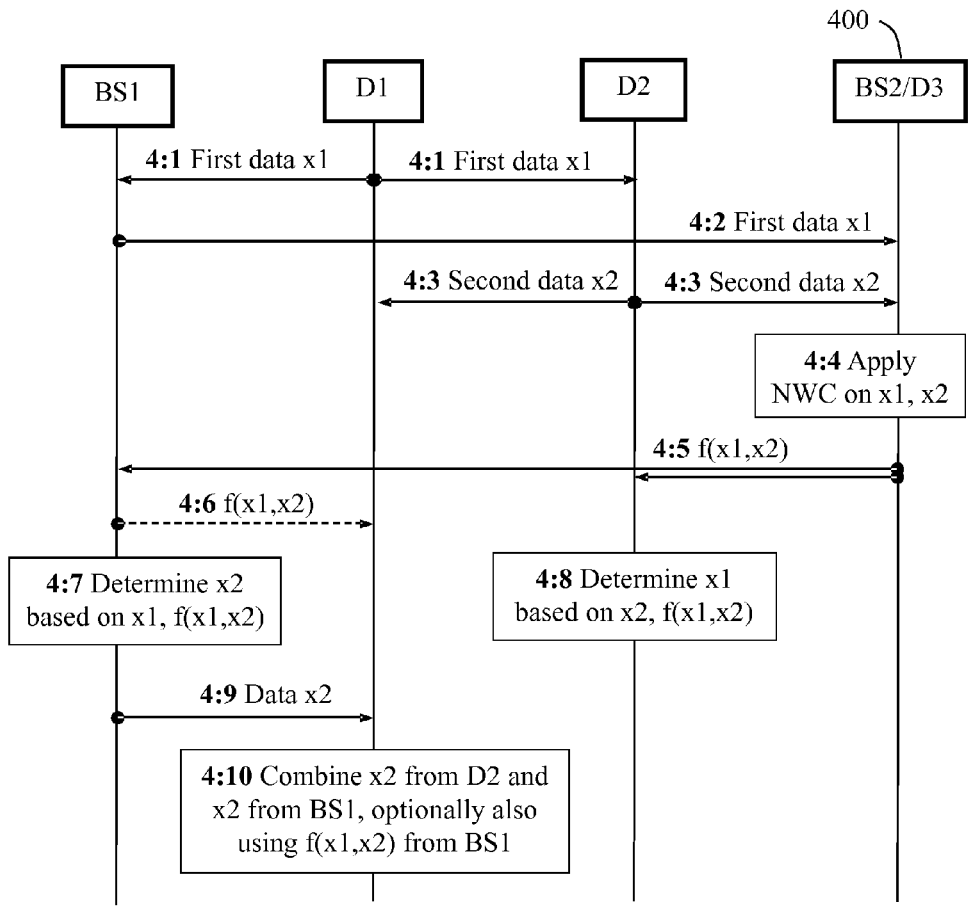
FIG. 4a is a signaling diagram illustrating an example of how data can be communicated between two wireless devices when the solution is employed, according to some possible embodiments.
Figure 4B:
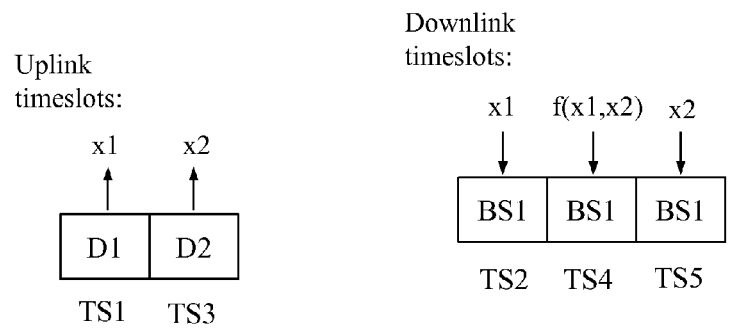

A communication scenario will now be described with reference to the signaling diagram in FIG. 4a and to the timeslot scheme in FIG. 4b, thus illustrating an example of how data can be communicated between two wireless devices when the solution is employed. This scenario thus involves a first base station BS1, a first wireless device D1, being served by BS1, a second wireless device D2, being served by a second base station BS2, and an assisting node 400 which may be either the second base station BS2 or a third wireless device D3. The signaling sequence is basically the same for both cases illustrated by FIGS. 2 and 3. In the following description and in FIGS. 4a, 4b, first data x1 is also referred to as "data x1" or just "x1" for short. Likewise, second data x2 is also referred to as "data x2" or just "x2" for short.

A first action 4:1 illustrates that the first device D1 transmits first data x1 in an uplink timeslot TS1 which is received both by the first base station BS1 over the cellular link of G1 and by the second device D2 over the D2D link of G12. These links are used for this action in both examples of FIGS. 2 and 3. A next action 4:2 illustrates that the first base station BS1 transmits the first data x1 to the assisting node 400, which is conveyed over the BS link from BS1 to BS2 in the example of FIG. 2 and over the cellular link of G3 from BS1 to device D3 in the example of FIG. 3. In this action, the first base station BS1 may transmit the first data x1 in a downlink timeslot TS2. If a fixed BS link is used in the case of FIG. 2 where BS2 is the assisting node 400, x1 is not necessarily transmitted in a specific timeslot.

Next, the second device D2 also transmits its data x2 in an uplink timeslot TS3 in another action 4:3, which is received both by the assisting node 400 and by the first device D1 over the D2D link with channel gain G12. For this action, x2 is received by the serving second base station BS2 over the cellular link with channel gain G2 in the example of FIG. 2, while x2 is received by the third device D3 over the D2D radio link with channel gain G23 in the example of FIG. 2. It should be noted that the order of actions 4:1 to 4:3 may be altered and these actions may be performed in any sequence order without departing from the solution.

The assisting node 400, i.e. BS2 or D3, then creates a network coded form of the first and second data f(x1,x2) by applying a network coding function on the first data x1 and the second data x2, in another action 4:4. The network coding function may be any suitable function with x1 and x2 as input, for example f(x1,x2)=x1+x2 to mention a simple example. However, any function may be used in this context with x1 and x2 as input, as long as the function is known to the receiver of f(x1,x2), and the solution is not limited in this respect. The receiver of f(x1,x2) is then able to compute x2 if x1 is known, or vice versa. The assisting node 400, BS2 or D3, then transmits the network coded form of the first and second data f(x1,x2) in an action 4:5, which is received by the first base station BS1, either over the BS link in the case of FIG. 2 or over the cellular link of G3 in an uplink timeslot, not shown, in the case of FIG. 3. The network coded form f(x1,x2) in action 4:5 may also be received by the second wireless device D2.

Optionally, the first base station BS1 may forward the received network coded form of the first and second data f(x1,x2) in a downlink timeslot TS4 to the first wireless device D1 in an optional action 4:6, which could help device D1 determine the second data x2 received from D2 over the D2D link of G12, based on its own data x1 and f(x1,x2). In a further action 4:7, the first base station BS1 determines the second data x2 based on the first data x1 which was received in action 4:1 from device D1 and further based on f(x1,x2) which was received in action 4:5 from the assisting node BS2 or D3. Another action 4:8 illustrates that the second wireless device D2 may determine the data x1 received from device D1 over the D2D link of G12, based on its own transmitted data x2 and f(x1,x2) received in action 4.5 from the assisting node. It should be noted that this action may help device D2 to determine x1 properly in case device D2 was not able to determine the first data x1 correctly when received from the first device in action 4.1 over the D2D link of G12.

Having determined the second data x2 based on x1 and f(x1,x2) in action 4:7, the first base station BS1 now transmits the second data x2 to the first wireless device D1 in a downlink timeslot TS5, in another action 4:9. This enables the first wireless device D1 to determine the second data x2, in an action 4.10, by combining the second data x2 received from the second wireless device D2 in action 4:3 and the second data x2 received from the first base station BS1 in action 4:9. It should be noted that this action may help device D1 to determine x2 properly in case device D1 was not able to determine the second data x2 correctly when received from the second device D2 in action 4.3 over the D2D link of G12 alone. By combining these two signals, the first wireless device D1 may thus be able to determine the second data x2 properly even if one or both of the signals were poorly received. Optionally, the first wireless device D1 may determine x2 further based on f(x1,x2) which may have been received from the first base station BS1 in the optional action 4:6.

The above procedure is thus an example of how an assisting node, D3 or BS2, may be employed to help the first wireless device D1 determine, e.g. decode, the second data x2 that has been transmitted by the second wireless device D2 in action 4:3. In addition, the assisting node may also help the second wireless device D2 determine, e.g. decode, the first data x1 that has been transmitted by the first wireless device D1 in action 4:1.

Figure 5:
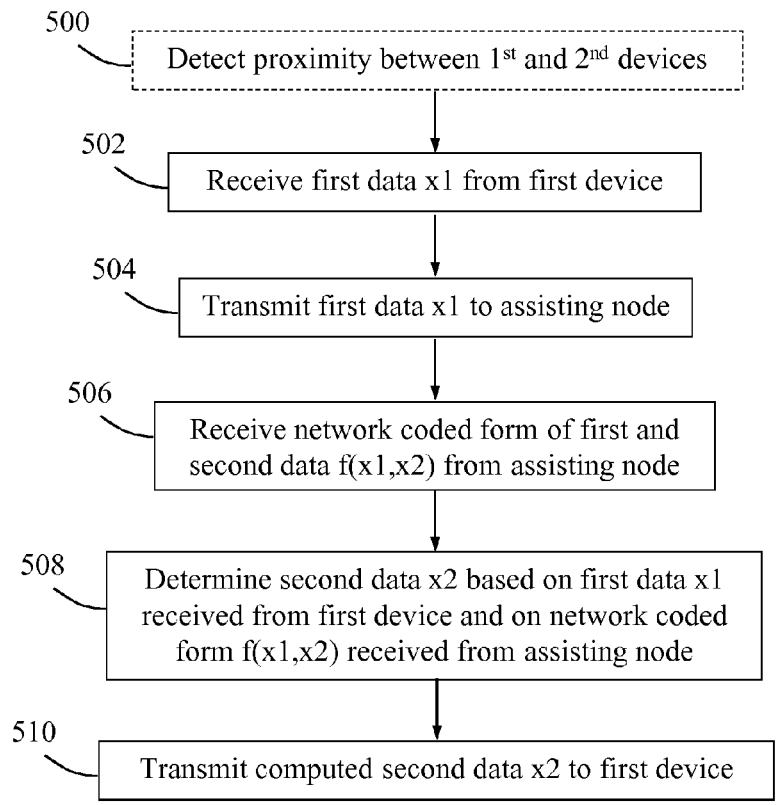
FIG. 5 is a flow chart illustrating a procedure in a base station, according to further possible embodiments.

An example of a procedure with actions, performed by a first base station in a radio network, will now be described with reference to the flow chart in FIG. 5. The first base station is thus arranged or configured for supporting a D2D communication between a first wireless device and a second wireless device. In this procedure, the first wireless device is served by the first base station and the second wireless device is served by a second base station in the radio network. This procedure thus illustrates how the first base station may operate such that the benefits of improved determination of received data, lower transmit power and reduced interference may be achieved, among other things, by employing a D2D communication with network coding provided by an assisting node. In the procedure of FIG. 5, the first and second base stations correspond to BS1 and BS2, respectively, the first and second wireless devices correspond to D1 and D2, respectively, and the assisting node corresponds to BS2 or D3, in the preceding examples of FIGS. 2, 3, 4a and 4b. Further, it is assumed that the function f is known to both the first base station and the assisting node.

A first optional action 500 illustrates that the first base station may detect proximity between the first and second wireless devices, which may be achieved based on measurements performed and reported by one or both of the first and second wireless devices. Proximity means thus that the two devices are within "hearing" distance of one another so that each wireless device is able to receive and detect signals transmitted by the other wireless device. For example, the devices may have been instructed by their respective serving base stations to transmit beacons suitable for such measurements, and to perform and report measurements on the transmitted beacons, according to regular procedures which will be described in more detail later below.

In another action 502, the first base station receives first data x1 from the first wireless device, which corresponds to action 4:1 in the preceding examples. In a further action 504, the first base station transmits the first data x1 to the assisting node, which corresponds to action 4:2 in the preceding examples. The first base station also receives from the assisting node a network coded form of the first data and second data f(x1,x2), in an action 506, wherein the second data x2 has been transmitted by the second wireless device to the assisting node. This action corresponds to action 4:5 in the preceding examples. The assisting node has thus created the network coded form of the first and second data f(x1,x2) by applying a network coding function on the first data x1 and the second data x2, basically as described for action 4:4 in the preceding examples.

In a further action 508, the first base station determines the second data x2 based on the first data x1 received from the first wireless device and on the network coded form of the first and second data f(x1,x2) received from the assisting node in the preceding action. The first base station is thus able to determine the second data x2 from the received x1 and f(x1,x2) by using any suitable known technique such as estimation, computation, and so forth. As mentioned above, the function f is already known to the first base station. This action 508 may be performed as described for action 4:7 in the preceding examples. A final action 510 illustrates that the first base station transmits to the first wireless device the determined second data, which corresponds to action 4:9 in the preceding examples. Thereby, the first base station supports the D2D communication between the first and second wireless devices by enabling the first wireless device to determine the second data x2 by combining the second data x2 transmitted by the second wireless device in the D2D communication and the second data x2 transmitted by the first base station.

The above procedure may be performed by the first base station according to various possible embodiments. In a possible embodiment, the first base station may transmit the first data x1 in action 504 to the second base station, the second base station being the assisting node. In another possible embodiment, the first base station may transmit the first data x1 in action 504 to a third wireless device, the third wireless device being the assisting node. In a further possible embodiment, the first base station may determine the second data x2 by performing a combining operation on the first data x1 and the network coded form of the first and second data f(x1,x2). An example of how the first base station may perform such a combination operation will be described in more detail later below.

An example of a procedure with actions, performed by an assisting node in a radio network, for supporting a D2D communication between a first wireless device and a second wireless device, will now be described with reference to the flow chart in FIG. 6. As in the previous examples, the first wireless device is served by a first base station and the second wireless device is served by a second base station. This procedure thus illustrates how the assisting node may operate in cooperation with the above-described first base station such that the benefits of improved determination of received data, lower transmit power and reduced interference may be achieved, among other things. It is assumed that the assisting node has been instructed, e.g. by one of the first and second base stations or by another network node, to act as follows when it has been decided to employ a D2D communication between the first and second wireless devices assisted by network coding performed by the assisting node.

A first action 600 illustrates that the assisting node receives first data x1 from the first base station, wherein the first data x1 has been transmitted by the first wireless device to the first base station. Action 600 corresponds to actions 4:2 and 504 in the preceding examples. In another action 602, the assisting node also receives second data x2 transmitted by the second wireless device, which corresponds to action 4:3 in the preceding examples. Actions 600 and 602 may be performed in the shown order or in a reverse order such that the second data x2 is received before the first data x1 is received.

In another action 604, the assisting node creates a network coded form of the first and second data f(x1,x2) by applying a Network Coding Function, NWC, on the first data x1 and the second data x2. This action may be performed as described for action 4:4 in the preceding examples. A final action 606 illustrates that the assisting node transmits the network coded form of the first and second data f(x1,x2) to the first base station, which corresponds to actions 4:5 and 506 in the preceding examples. Thereby, the assisting node supports the D2D communication between the first and second wireless devices by enabling the first base station to determine the second data x2 based on the first data x1 and on the network coded form of the first and second data f(x1,x2), and to transmit the determined second data x2 to the first wireless device. In different possible embodiments, the assisting node may be either the second base station or a third wireless device, as illustrated by FIGS. 2 and 3, respectively.

An example of a procedure with actions, performed by a first wireless device in a radio network, for supporting a D2D communication between the first wireless device and a second wireless device, will now be described with reference to the flow chart in FIG. 7. As in the previous examples, the first wireless device is served by a first base station and the second wireless device is served by a second base station. This procedure thus illustrates how the first wireless device may operate in cooperation with the second wireless device and the first base station such that the benefits of improved spectral and energy efficiency, efficient resource utilization, lower transmit power and reduced interference may be achieved, among other things.

A first action 700 illustrates that the first wireless device transmits first data x1 to the second wireless device and to the first base station, which corresponds to actions 4:1 and 502 in the preceding examples. In another action 702, the first wireless device receives second data x2 from the second wireless device in the D2D communication, which corresponds to action 4:3 in the preceding examples.

The first wireless device also receives the second data x2 once more, in an action 704, this time x2 is received from the first base station wherein the first base station has determined the second data x2 based on the first data x1 received from the first wireless device and on a network coded form of the first and second data f(x1,x2) received from an assisting node, which corresponds to actions 4:9 and 510 in the preceding examples. A final action 706 illustrates that the first wireless device determines the second data x2 by combining the second data x2 received from the second wireless device and the second data x2 received from the first base station. This action may be performed as described for action 4:10 in the preceding examples. In a possible embodiment, the first wireless device may determine the second data x2 also using a network coded form of the first and second data f(x1,x2) received from the first base station as in action 4:6 in the preceding examples.

Figure 8:
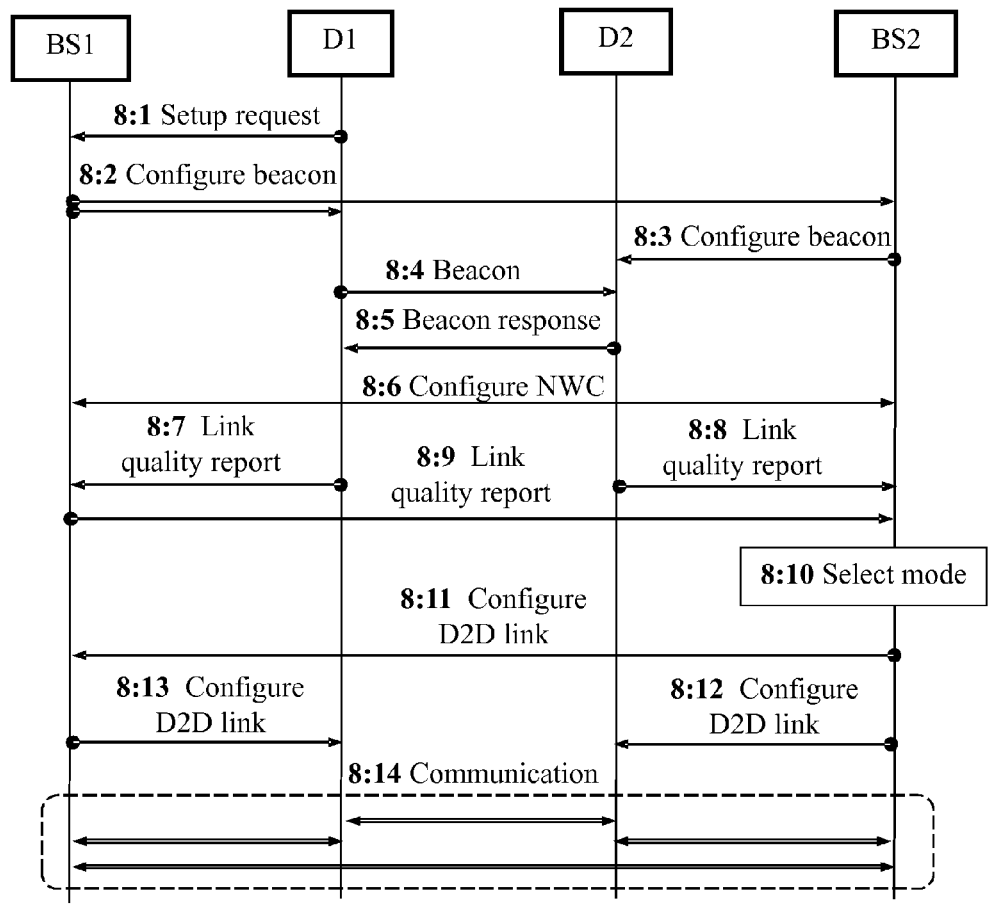
FIG. 8 is a signalling diagram illustrating an example of a procedure to set up a D2D communication in order to employ the solution, according to further possible embodiments.

A procedure for setting up the above-described D2D communication between the first and second wireless devices supported by the assisting node, will now be described with reference to FIG. 8 which illustrates an example of a signalling procedure between the first base station BS1, the first wireless device D1, the second wireless device D2, and the second base station BS2. This procedure involves mode selection which is basically controlled by the second base station BS2, although it may alternatively or jointly be controlled by the first base station BS1 as well.

The procedure starts in this example when the first wireless device D1 sends a setup request message to the serving first base station BS1 for a communication with the second device D2, as shown by a first action 8:1. In this setup request message, device D1 may inform the first base station BS1 about its own capabilities, including NWC related capabilities. Device D1 may also include information in the message about specific services it requires or offers. In the setup request message, device D1 may further indicate the second wireless device D2 with which the communication is to be established. The second base station BS2 may have received a similar setup request message, not shown, from the second wireless device D2.

Further, the first base station BS1 configures a beacon configuration message that the two devices D1 and D2 should use during a so-called network assisted peer discovery phase, by sending the beacon configuration message to device D1 and to the second base station BS2 in action 8:2. The second base station BS2 then basically forwards the beacon configuration message to the second wireless device D2 in another action 8:3. In this beacon configuration message, the first base station BS1 may instruct the wireless devices D1, D2 what radio resources in time-frequency they should use when transmitting their beacon signals and what information they should include in the beacons. In networks employing Long Term Evolution, LTE, radio resources are specified as Physical Resource Blocks, PRBs.

Next, the first wireless device D1 and the second wireless device D2 use the configuration data as instructed by the first base station BS1 when they broadcast their beacons. Thus, an action 8:4 illustrates that device D1 transmits its beacon with NWC capability indicated, and the second device D2 replies to device D1, in a "beacon response signal" with NWC capability indicated, in action 8:5. The first and second base stations BS1 and BS2 further exchange signalling to configure NWC, in another action 8:6.

Once the wireless devices D1 and D2 have exchanged their beacons, they both send a link quality report to their respective serving base stations BS1 and BS2, which is illustrated by action 8:7 and action 8:8, respectively. The link quality report thus indicates quality of the D2D link between D1 and D2 and may also indicate quality of the respective first and second cellular radio links between the devices D1 and D2 and their respective serving base stations BS1, BS2, which link quality reports are useful as input to the mode selection to be made by the base station BS2. The first base station BS1 further forwards the link quality report from D1 to the second base station BS2, in another action 8:9, which thus enables BS2 to make the mode selection. This allows the second base station BS2 to consider an operation mode involving a D2D communication supported by NWC in an assisting node as a potential option when performing the mode selection.

Another action 8:10 illustrates that the base station BS2 makes the mode selection, i.e. a decision of which operation mode to apply, based on the link quality reports received in actions 8:8 and 8:9. This decision may be further based on measurements made by the base stations BS1, BS2 on the respective cellular radio links between the first and second base stations and the first and second wireless devices, respectively. The second base station BS2 may make the mode selection decision based on the link quality measurements and reports as well as current resource usage and possibly other factors.

In this example, the base station BS2 decides to employ a D2D communication between device D1 and device D2, supported by NWC performed by an assisting node. As a result, action 8:11 and action 8:12 illustrate that the second base station BS2 sends configuration messages to the first base station BS1 and the second device D2, respectively, according to the mode selection decision in the foregoing action 8:10. Another action 8:13 illustrates that the first base station BS1 also sends a D2D link configuration message to the first device D1 in order to establish the D2D communication between D1 and D2. Now follows the actual communication of data which is schematically illustrated by action 8:14 which may be conducted according to any of the embodiments described for FIGS. 2-7 above.

Figure 9:
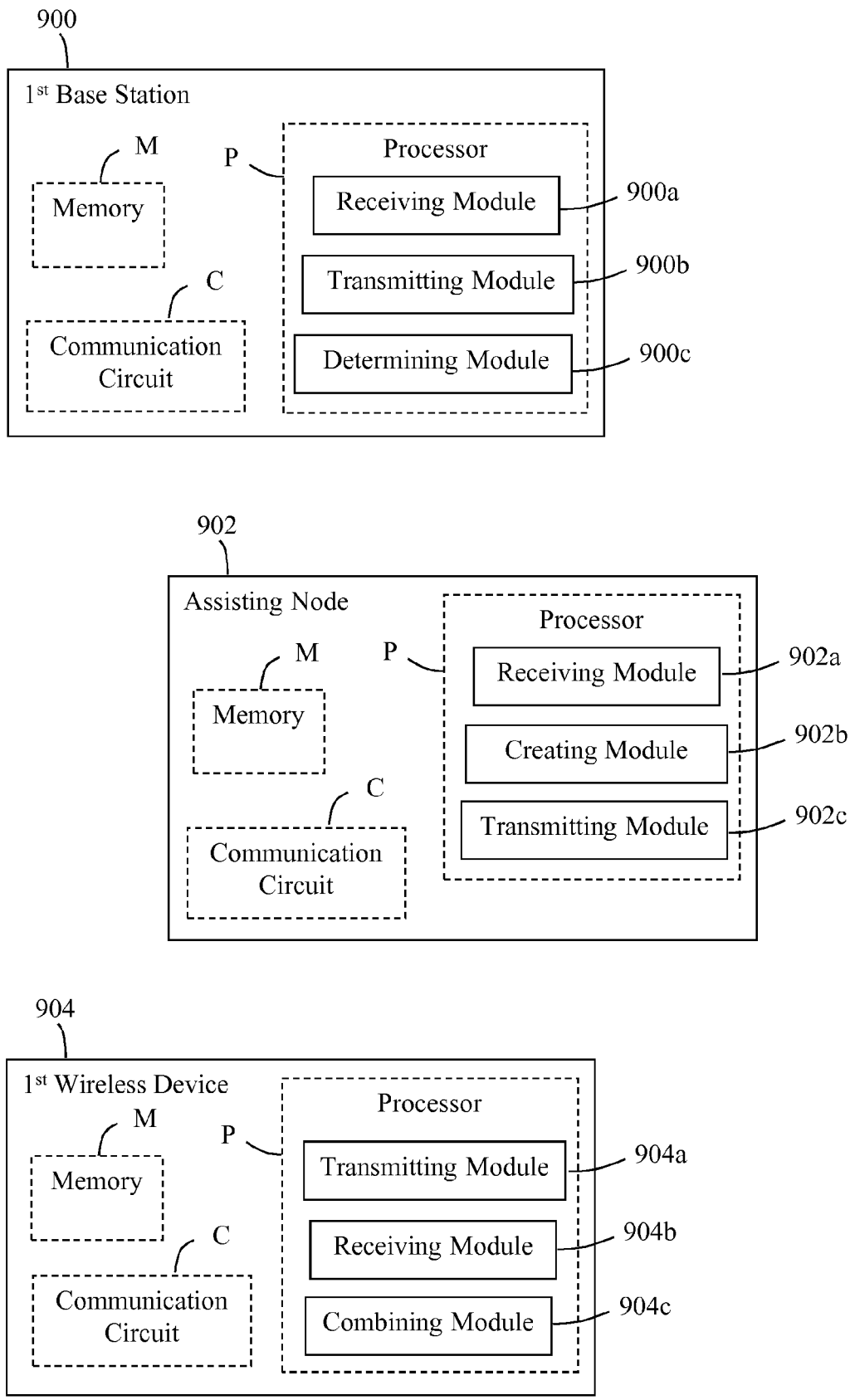
FIG. 9 is a block diagram illustrating a first base station, an assisting node and a first wireless device in more detail, according to further possible embodiments.

The block diagram in FIG. 9 illustrates a detailed but non-limiting example of how a first base station 900, an assisting node 902 and a first wireless device 904, respectively, may be structured to bring about the above-described solution and embodiments thereof. In this figure, the first base station 900, the assisting node 902 and the first wireless device 904 may be configured to operate according to any of the examples and embodiments of employing the solution as described above, where appropriate, and as follows. It is assumed that the first wireless device 904 is served by the first base station 900, and that a second wireless device, not shown, is served by a second base station in the radio network.

Each of the first base station 900, assisting node 902 and first wireless device 904 is shown to comprise a communication circuit "C" with suitable equipment for transmitting and receiving signals with information in the manner described herein, a memory "M" for storage of various information and data whenever needed, and a processor "P" which may comprise different functional modules as described below.

Each processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes. Further, each memory M may be a flash memory, a Random-Access Memory (RAM), a Read-Only Memory (ROM) or an Electrically Erasable Programmable ROM (EEPROM), and various program modules could be distributed on different computer program products.

The first base station 900 may be configured or arranged to perform at least the actions 502-510 of the flow chart in FIG. 5 in the manner described above. These actions may be performed by means of different modules in the first base station 900 as follows. The first base station 900 is operable in a radio network and arranged to support a D2D communication between the first wireless device 904 and the second wireless device.

The first base station 900 comprises means configured to receive first data x1 transmitted from the first wireless device 904, which may be performed by means of a receiving module 900a, e.g. as described above for action 502. The first base station 900 also comprises means configured to transmit the first data x1 to the assisting node 902, which may be performed by means of a transmitting module 900b, e.g. as described above for action 504. The first base station 900 also comprises means configured to receive from the assisting node 902 a network coded form of the first data and second data f(x1,x2), wherein the second data x2 has been transmitted by the second wireless device to the assisting node 902. This receiving may be performed by means of the receiving module 900a, e.g. as described above for action 506.

The first base station 900 further comprises means configured to determine the second data x2 based on the first data x1 received from the first wireless device 904 and on the network coded form of the first and second data f(x1,x2) received from the assisting node 902, which may be performed by means of a determining module 900c, e.g. as described above for action 508. The first base station 900 also comprises means configured to transmit to the first wireless device 904 the determined second data x2, which may be performed by means of the transmitting module 900b, e.g. as described above for action 510. In this way, the first base station 900 supports the D2D communication by enabling the first wireless device 904 to determine the second data x2 by combining the second data x2 transmitted by the second wireless device in the D2D communication and the second data x2 transmitted by the first base station 900.

Figure 6:
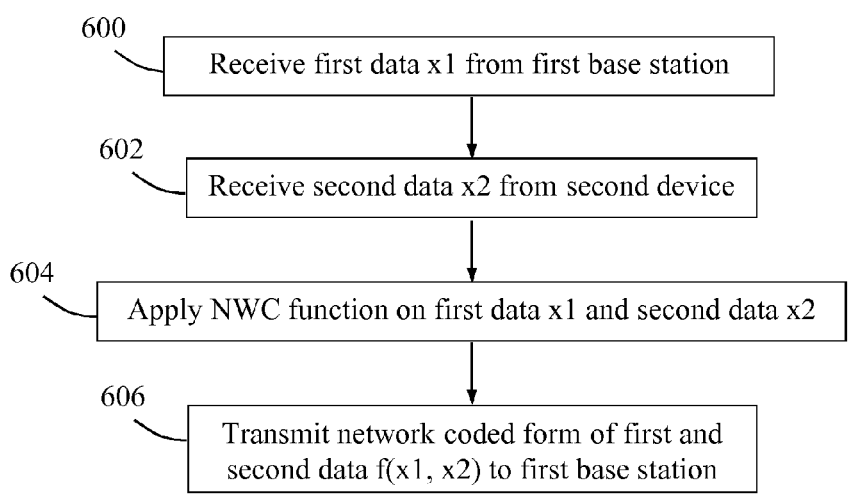
FIG. 6 is a flow chart illustrating a procedure in an assisting node, according to further possible embodiments.

The assisting node 902 may be configured or arranged to perform at least the actions 600-606 of the flow chart in FIG. 6 in the manner described above. These actions may be performed by means of different modules in the assisting node 902 as follows. The assisting node 902 is arranged to support a D2D communication between the first wireless device 904 and a second wireless device.

The assisting node 902 comprises means configured to receive first data x1 from the first base station 900 wherein the first data x1 has been transmitted by the first wireless device 904 to the first base station 900, which receiving may be performed by means of a receiving module 902a, e.g. as described above for action 600. The assisting node 902 also comprises means configured to receive second data x2 from the second wireless device, which receiving may be performed by means of the receiving module 902a, e.g. as described above for action 602. The assisting node 902 also comprises means configured to create a network coded form of the first and second data f(x1,x2) by applying a network coding function on the first data x1 and the second data, which creating may be performed by means of a creating module 902b, e.g. as described above for action 604.

The assisting node 902 further comprises means configured to transmit the network coded form of the first and second data f(x1,x2) to the first base station 900, which transmitting may be performed by means of a transmitting module 902c, e.g. as described above for action 606. The assisting node 902 thus supports the D2D communication by enabling the first base station to determine the second data x2 based on the first data x1 and on the network coded form of the first and second data f(x1,x2), and to transmit the determined second data x2 to the first wireless device.

Figure 7:
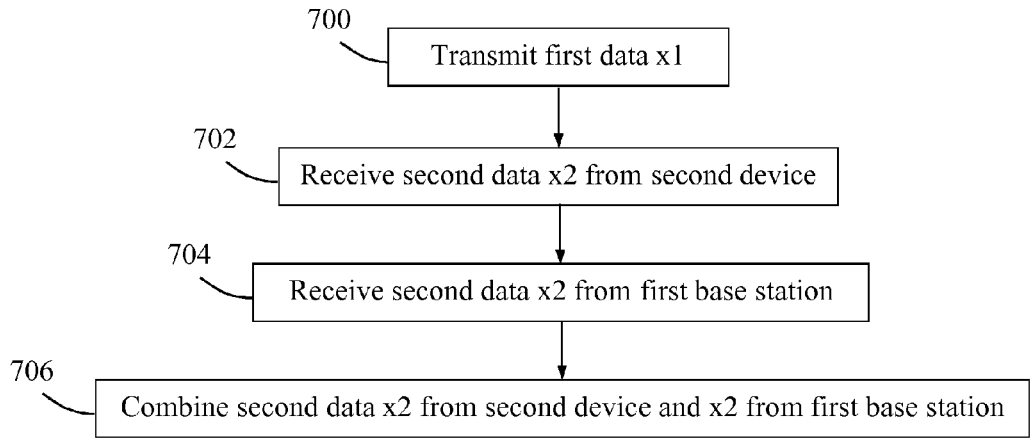
FIG. 7 is a flow chart illustrating a procedure in a wireless device, according to further possible embodiments.

The first wireless device 904 may be configured or arranged to perform at least the actions 700-706 of the flow chart in FIG. 7 in the manner described above. These actions may be performed by means of different modules in the first wireless device 904 as follows. The first wireless device 904 is arranged to support a D2D communication between the first wireless device 904 and a second wireless device.

The first wireless device 904 comprises means configured to transmit first data x1 to the second wireless device and to the first base station 900, which transmitting may be performed by means of a transmitting module 904a, e.g. as described above for action 700. The first wireless device 904 also comprises means configured to receive second data x2 from the second wireless device in the D2D communication, which receiving may be performed by means of a receiving module 904b, e.g. as described above for action 702. The first wireless device 904 also comprises means configured to receive the second data x2 from the first base station wherein the first base station 900 has determined the second data x2 based on the first data x1 received from the first wireless device 904 and on a network coded form of the first and second data f(x1,x2) received from the assisting node 902. The above receiving of the second data x2 from the first base station 900 may be performed by means of the receiving module 904b, e.g. as described above for action 704. The first wireless device 904 further comprises means configured to determine the second data x2 by combining the second data x2 received from the second wireless device and the second data x2 received from the first base station 900, which determining may be performed by means of a combining module 904c, e.g. as described above for action 706.

It should be noted that FIG. 9 illustrates some possible functional modules 900a-c, 902a-c, 904a-c in the first base station 900, the assisting node 902 and the first wireless device 904, respectively, and the skilled person is able to implement these functional modules in practice using suitable software and hardware. Thus, the solution is generally not limited to the shown structures of the first base station 900, the assisting node 902 and the first wireless device 904, and the functional modules 900a-c, 902a-c, 904a-c may be configured to operate according to any of the features described in this disclosure, where appropriate.

The embodiments and features described herein may be implemented in computer programs comprising instructions which, when executed on at least one processor in the first base station 900, the assisting node 902 and the first wireless device 904, respectively, cause the at least one processor to carry out any of the proceedings and embodiments described herein.

The above-described functionality of the base station may be implemented as a computer program comprising computer readable code which, when run on the base station, causes the base station to perform the method according to any of the above embodiments where appropriate. The base station's operation may also be implemented in a computer program product comprising a computer readable medium on which a computer program is stored, wherein the computer program comprises computer readable code which, when run on a base station, causes the base station to perform the method according to any of the above embodiments where appropriate.

Also, the above-described functionality of the assisting node may be implemented as a computer program comprising computer readable code which, when run on the assisting node, causes the assisting node to perform the method according to any of the above embodiments where appropriate. The assisting node's operation may also be implemented in a computer program product comprising a computer readable medium on which a computer program is stored, wherein the computer program comprises computer readable code which, when run on the assisting node, causes the assisting node to perform the method according to any of the above embodiments where appropriate.

Also, the above-described functionality of the first wireless device may be implemented as a computer program comprising computer readable code which, when run on the first wireless device, causes the first wireless device to perform the method according to any of the above embodiments where appropriate. The first wireless device's operation may also be implemented in a computer program product comprising a computer readable medium on which a computer program is stored, wherein the computer program comprises computer readable code which, when run on a first wireless device, causes the first wireless device to perform the method according to any of the above embodiments where appropriate.

It was mentioned above that an algorithm may be employed for deciding whether it is favorable to employ a D2D communication between the first and second wireless devices assisted by network coding performed by the assisting node, instead of employing other operation modes, based on the above-mentioned channel gains. An example of a procedure for selecting an operation mode for a communication between two wireless devices D1 and D2, will now be described with reference to the flow chart in FIG. 10 which is also reflected in a table for mode selection shown in FIG. 11, to which reference will be made as well in the description below. This mode selection procedure or algorithm may be performed by one of the base stations BS1 and BS2, or by another network node that may be used for such mode selection.

Figure 10:
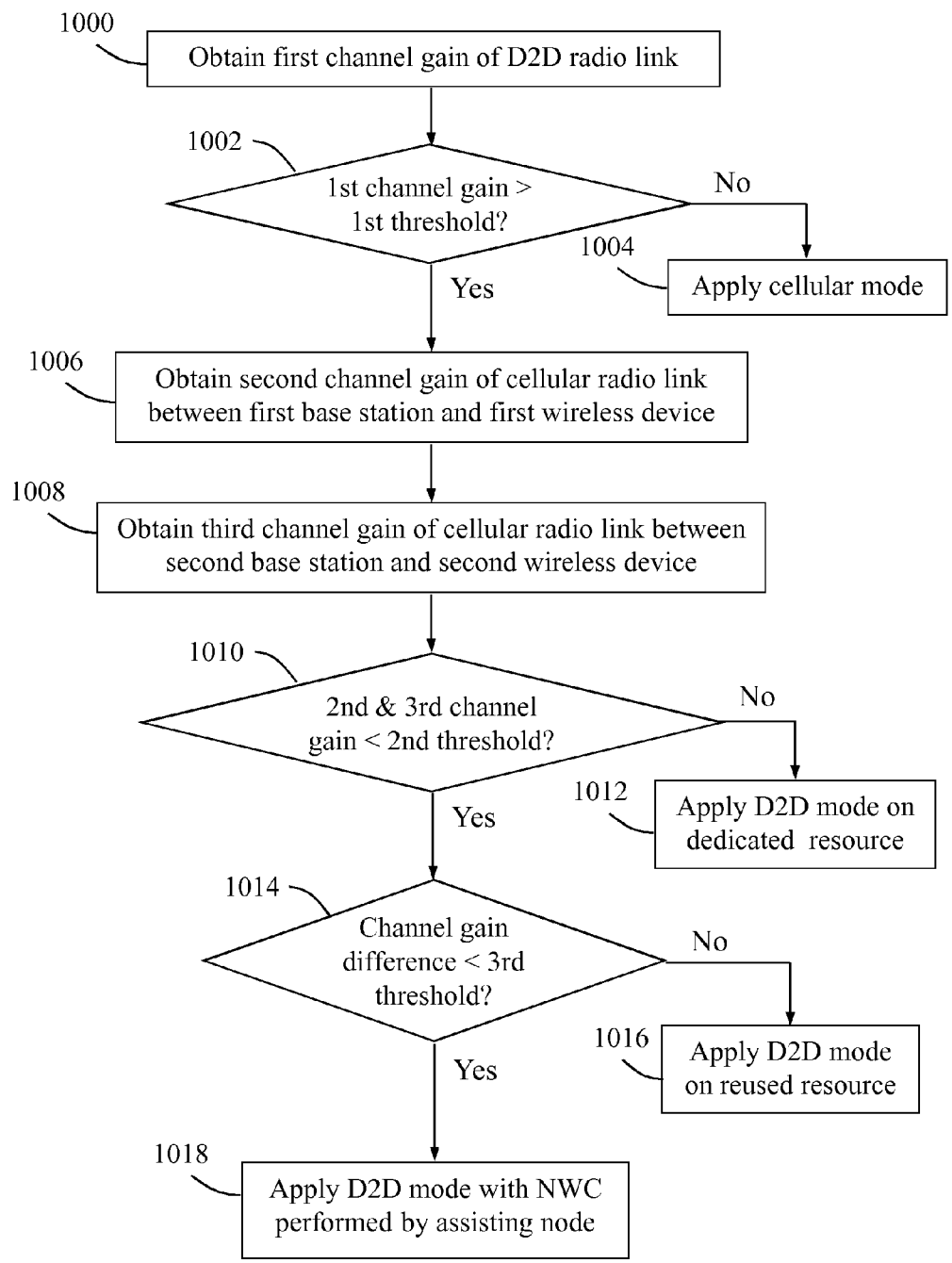
FIG. 10 is a flow chart illustrating a procedure for mode selection which may be used when the solution is employed, according to further possible embodiments.

FIG. 10 thus illustrates the algorithm for evaluation of various thresholds related to channel gains of different radio links for selecting one of several available operation modes 1-4, where a D2D mode with NWC provided by the assisting node may be selected such that the communication between devices D1 and D2 is conducted basically as illustrated in FIG. 2 and FIG. 4. The radio links and corresponding channel gains mentioned in this procedure are as defined in FIG. 2. The available operation modes are as follows:

Mode 1 is the pure cellular mode using a cellular link between device D1 and base station BS1 and another cellular link between device D2 and base station BS2, Mode 2 is the D2D mode using a D2D link between device D1 and device D2 on dedicated radio resources, Mode 3 is the D2D mode using the D2D link on reused radio resources, and Mode 4 is the D2D mode with NWC provided by the assisting node, using the D2D link, the cellular link between device D1 and base station BS1 and the cellular link between device D2 and base station BS2. In this mode, it is assumed that base station BS2 can act as the above-described assisting node.

The node that performs the following actions will be referred to as the "evaluating node". In a first action 1000, the evaluating node, e.g. BS1 or BS2, obtains a first channel gain G12 of the D2D link between the first wireless device D1 and the second wireless device D2. The evaluating node then checks in an action 1002 whether the obtained first channel gain G12 is above a first threshold, denoted Th1 in FIG. 11. If not, it can be deduced that the D2D radio link is not good enough for any D2D communication and the conventional cellular mode of operation with no D2D communication is selected and applied in an action 1004. This action corresponds to Mode 1 in FIG. 11.

On the other hand, if the first channel gain G12 is above the first threshold Th1, the evaluating node proceeds to obtain a second channel gain of a cellular radio link between the first base station and the first wireless device, in an action 1006. The evaluating node further obtains a third channel gain of a cellular radio link between the second base station and the second wireless device, in another action 1008. The second and third channel gains are denoted Gi=G1 and Gi=G2, respectively, in FIG. 11. It should be noted that it is not necessary to obtain the first, second and third channel gains in the sequence order shown in this example, but they could rather be obtained in any order depending on implementation.

The evaluating node then checks in an action 1010 whether both of the second and third channel gains G1, G2 are below the second threshold, denoted Th2 in FIG. 11. If not, it can be deduced that at least one of the cellular radio links is not weak enough for making the D2D communication with NWC provided by the assisting node more beneficial, and a D2D communication mode of operation on dedicated radio resources is selected and applied in an action 1012. This action corresponds to Mode 2 in FIG. 11.

On the other hand, if both of the second and third channel gains G1, G2 are below the second threshold Th2, the evaluating node further checks in an action 1014 whether a difference G12-Gi between the first channel gain G12 and each of the second and third channel gains G1, G2 is below a third predefined threshold, denoted Th3 in FIG. 11. If not, it can be deduced that the channel gain of at least one of the cellular radio links is too different from the D2D radio link for beneficial D2D communication with NWC provided by the assisting node, and a D2D communication mode of operation on reused radio resources is selected and applied in an action 1016. This action corresponds to Mode 3 in FIG. 11.

On the other hand, if the difference G12-Gi between the first channel gain G12 and each of the second and third channel gains G1, G2 is above the third threshold Th3, the evaluating node selects and applies the operation mode of D2D communication with NWC provided by the assisting node, in a final shown action 1018. This action corresponds to Mode 4 in FIG. 11. In other words, Mode 4 requires that both G12-G1 and G12-G2 are above the third threshold Th3.

Hence, this mode selection procedure dictates that the operation mode of D2D communication with NWC provided by the assisting node is selected and applied when the first channel gain G12 is above the first threshold Th1, both of the second and third channel gains G1, G2 are below the second threshold Th2, and the difference G12-Gi between the first channel gain G12 and each of the second and third channel gains G1, G2 is above the third threshold Th3.

It was mentioned above that the first base station BS1 may determine the second data x2, e.g. in the above-described actions 4:7 and 508, by performing a combining operation on the first data x1 received from the first wireless device D1 and on the network coded form of the first and second data f(x1,x2) received from the assisting node BS2 or D3. This combining operation may be known as such. In this context, "combining operation" means that the receiving node, in this case the first base station BS1, produces an estimate of the data that has been transmitted by the second wireless device D2, based on the received and stored first data x1 and the received network coded form f(x1,x2). In this operation, the receiving first base station BS1 uses the data x1 received directly from the first wireless device D1 and the network coded form f(x1,x2) received from the assisting node BS2 or D3, as well as its own transmitted data which has been saved by the base station and the device D1 as described above.

Figure 12:
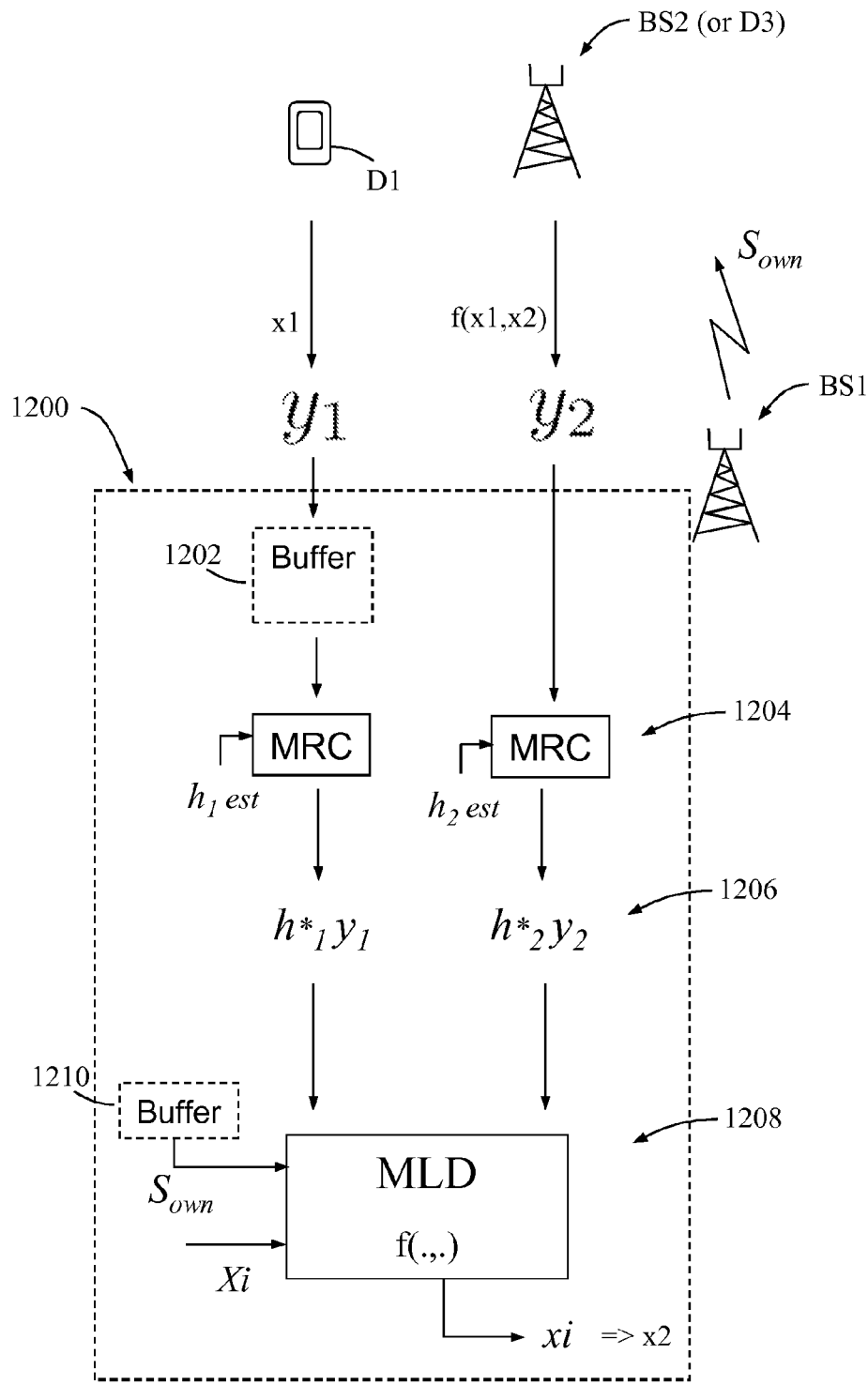
FIG. 12 is a diagram illustrating how a combining operation may be executed by a base station when the solution is employed.

An example of how such a combining operation might be executed by a base station is illustrated by FIG. 12 and reference will also be made to the example illustrated by FIGS. 2a and 2b. The base station 1200 receives a signal $y_1$ from device D1 over the cellular radio link with the channel gain G1 in the TDD timeslot 1. Numeral 1202 indicates that the signal $y_1$ is temporarily buffered in base station 1200. The base station 1200 also transmits its own data which comprises a symbol denoted $S_{own}$ which base station 1200 stores in a buffer 1210. The base station 1200 further receives a signal $y_2$ from the second wireless device D2 over the cellular link with the path gain G2 at a later point in the TDD timeslot 4.

To execute the combining operation, the base station 1200 may perform Maximum Likelihood Detection, MLD, according to existing techniques. To this end, the base station 1200 needs to use the specific function f(.,.) that was used by the device D2 to generate the network coded data. When performing the MLD operation, the base station 1200 applies this specific function f(.,.) to the elements of a set of possible symbols Xi and its own transmitted symbol $S_{own}$, to compute f(Xi,x1), since this quantity is needed in the MLD operation. The comparison between the signal $y_1$ received from the device D1 and the elements of the set containing the possible Xi values is also part of the MLD operation, according to the known MLD technique.

Returning to FIG. 12, numeral 1204 indicates that the base station 1200 performs a Maximum Ratio Combining, MRC, operation on each of the signals $y_1$ and $y_2$. The output from the MRC operation is a product of the complex conjugate of the estimated channel $h^*_1$ and the received signal $y_1$ on the cellular link between the base station 1200 and D1, and a product of the complex conjugate of the estimated channel $h^*_2$ and the received signal $y_2$ on the link between the base station 1200 and D2. These two complex conjugates 1206 are applied in the MLD operation 1208 for different combinations of the own transmitted symbol $S_{own}$ that was stored in the buffer 1210, and each of the set of possible symbols Xi. The outcome of this MLD operation 1208 is an estimated symbol $S_i$ of the data x1 embedded in the signal $y_1$ received from the device D1.

By performing such a combining operation e.g. as outlined above, the base station 1200 is able to decode the signal $y_1$ received from the device D1 by assistance from the signal $y_2$ from the device D2 with greater accuracy and reliability, e.g. by achieving lower Symbol Error Rate (SER) and low Bit Error Rate (BER) in the communication. Thereby, it is possible to reduce the transmit power at device D1 since it does not have to be as strong as when NWC is not applied. It should be noted that the operation in FIG. 12 may likewise be performed in a corresponding manner by the device D2 as well, e.g. the above-described action 4:8, for decoding the signal with data x1 transmitted by the device D1 to determine the data x1.

While the solution has been described with reference to specific exemplary embodiments, the description is generally intended to illustrate the inventive concept and should not be taken as limiting the scope of the solution. For example, the terms "base station", "wireless device", "assisting node", "beacon", channel gain" and "network coded form" have been used throughout this description, although any other corresponding entities, functions, and/or parameters could also be used having the features and characteristics described here. The solution is defined by the appended claims.

The invention claimed is:

1. A method performed by a first base station in a radio network, for selecting a mode of operation for communication between a first wireless device and a second wireless device, the first wireless device being served by the first base station and the second wireless device being served by a second base station of the radio network, the method comprising:

obtaining a first channel gain of a device-to-device (D2D) link between the first wireless device and the second wireless device;

checking whether the obtained first channel gain is above a first threshold;

selecting a mode of operation from among a conventional cellular mode of operation with no D2D communication, a D2D communication mode of operation with network coding (NWC), and a D2D communication mode of operation without NWC, wherein said selecting is based at least in part on said checking, such that the conventional cellular mode of operation with no D2D communication is selected responsive to determining that the obtained first channel gain is equal to or below the first threshold, the D2D communication mode of operation with NWC is selected responsive to determining that the obtained first channel gain is greater than the first threshold, that both an obtained second channel gain of a cellular radio link between the first base station and the first wireless device and an obtained third channel gain of a cellular radio link between the second base station and the second wireless device are below a second threshold, and that both a difference between the obtained first channel gain and the obtained second channel gain and a difference between the obtained first channel gain and the obtained third channel are below a third threshold, and the D2D communication mode of operation without NWC is selected otherwise; and selectively sending one or more configuration messages to the first wireless device or to the first wireless device and to the second base station, in accordance with the selected mode.

2. The method of claim 1, wherein obtaining the first channel gain comprises receiving a link quality report indicating a quality of the D2D link between the first wireless device and the second wireless device from at least one of the first wireless device and the second base station.

3. The method of claim 1, wherein the method further comprises obtaining the second channel gain by receiving a link quality report indicating a quality of the cellular radio link between the first base station and the first wireless device from the first wireless device.

4. The method of claim 1, wherein the method further comprises obtaining the third channel gain by receiving a link quality report indicating a quality of the link between the cellular radio link between the second base station and the second wireless device from the second base station.

5. The method of claim 1, wherein applying the selected mode of operation comprises, when applying the D2D communication mode of operation with NWC:

receiving first data from the first wireless device;
transmitting the first data to an assisting node;
receiving, from the assisting node, a network coded form of the first data and second data, wherein the second data has been transmitted by the second wireless device to the assisting node;
determining the second data based on the first data received from the first wireless device and based on the network coded form of the first and second data received from the assisting node; and
transmitting to the first wireless device the determined second data.

6. The method according to claim 5, wherein the first base station transmits the first data to the second base station, the second base station being the assisting node.

7. The method of claim 5, wherein the first base station transmits the first data to a third wireless device, the third wireless device being the assisting node.

8. The method of claim 5, wherein the first base station determines the second data by performing a combining operation on the first data and the network coded form of the first and second data.

9. The method of claim 5, wherein the first base station forwards the received network coded form of the first and second data to the first wireless device.

10. A first base station for use in a radio network, the first base station being arranged to support a Device-to-Device (D2D) communication between a first wireless device and a second wireless device, the first wireless device being served by the first base station and the second wireless device being served by a second base station in the radio network, wherein the first base station comprises:
a communication circuit configured to communicate with the first base station and with an assisting node; and
a processor configured to:
obtain a first channel gain of a device-to-device (D2D) link between the first wireless device and the second wireless device;
check whether the obtained first channel gain is above a first threshold;
select a mode of operation from among a conventional cellular mode of operation with no D2D communication, a D2D communication mode of operation with network coding (NWC), and a D2D communication mode of operation without NWC, wherein said selecting is based at least in part on said checking, such that the conventional cellular mode of operation with no D2D communication is selected responsive to determining that the obtained first channel gain is equal to or below the first threshold, the D2D communication mode of operation with NWC is selected responsive to determining that the obtained first channel gain is greater than the first threshold, that both an obtained second channel gain of a cellular radio link between the first base station and the first wireless device and an obtained third channel gain of a cellular radio link between the second base station and the second wireless device are below a second threshold, and that both a difference between the obtained first channel gain and the obtained second channel gain and a difference between the obtained first channel gain and the obtained third channel are below a third threshold, and the D2D communication mode of operation without NWC is selected otherwise; and
selectively send one or more configuration messages to the first wireless device or to the first wireless device and to the second base station, in accordance with the selected mode.

11. The first base station of claim 10, wherein the processing circuit is configured to obtain the first channel gain by receiving a link quality report indicating a quality of the D2D link between the first wireless device and the second wireless device from at least one of the second base station, via the communication circuit, and the first wireless device, via a receiver circuit.

12. The first base station of claim 10, wherein the processing circuit is configured to obtain the second channel gain by receiving a link quality report indicating a quality of the cellular radio link between the first base station and the first wireless device from the first wireless device, via a receiver circuit.

13. The first base station of claim 10, wherein the processing circuit is configured to obtain the obtain the third channel gain by receiving a link quality report indicating a quality of the link between the cellular radio link between the second base station and the second wireless device from the second base station, via the communication circuit.

14. The first base station of claim 10, wherein the first base station further comprises a receiver circuit and a transmitter circuit, the receiver circuit and transmitter circuit being configured for communication with the first wireless device, and wherein the processing circuit is further configured to, when applying the D2D communication mode of operation with NWC:
receive first data from the first wireless device, via the receiving circuit;
transmitting the first data to an assisting node, via the communication circuit;
receiving from the assisting node, via the communication circuit, a network coded form of the first data and second data, wherein the second data has been transmitted by the second wireless device to the assisting node;
determining the second data based on the first data received from the first wireless device and based on the network coded form of the first and second data received from the assisting node; and
transmitting to the first wireless device, via the transmitter circuit, the determined second data.

15. A non-transitory computer-readable medium comprising, stored thereupon, computer program instructions that, when executed on at least one processor in a first base station in a radio network, cause the at least one processor to select a mode of operation for communication between a first wireless device and a second wireless device, the first wireless device being served by the first base station and the second wireless device being served by a second base station of the radio network, wherein the computer program instructions comprise instructions for:
obtaining a first channel gain of a device-to-device (D2D) link between the first wireless device and the second wireless device;
checking whether the obtained first channel gain is above a first threshold;
selecting a mode of operation from among a conventional cellular mode of operation with no D2D communication, a D2D communication mode of operation with network coding (NWC), and a D2D communication mode of operation without NWC, wherein said selecting is based at least in part on said checking, such that the conventional cellular mode of operation with no D2D communication is selected responsive to determining that the obtained first channel gain is equal to or below the first threshold, the D2D communication mode of operation with NWC is selected responsive to determining that the obtained first channel gain is greater than the first threshold, that both an obtained second channel gain of a cellular radio link between the first base station and the first wireless device and an obtained third channel gain of a cellular radio link between the second base station and the second wireless device are below a second threshold, and that both a difference between the obtained first channel gain and the obtained second channel gain and a difference between the obtained first channel gain and the obtained third channel are below a third threshold, and the D2D communication mode of operation without NWC is selected otherwise; and selectively sending one or more configuration messages to the first wireless device or to the first wireless device and to the second base station.

* * * * *